US008223928B2

(12) United States Patent
Poels (10) Patent No.: US 8,223,928 B2
(45) Date of Patent: Jul. 17, 2012

(54) METHOD OF AND A DEVICE FOR QUANTIFYING A TONE SIGNAL RECEIVED IN A TELECOMMUNICATIONS NETWORK

(75) Inventor: Martinus Petrus Johannes Maria Poels, Venray (NL)

(73) Assignee: V.S.N. Beheer B.V., Venray (NL)

( * ) Notice: Subject to any disclaimer, the term of this patent is extended or adjusted under 35 U.S.C. 154(b) by 144 days.

(21) Appl. No.: 12/872,118

(22) Filed: Aug. 31, 2010

(65) Prior Publication Data

US 2011/0051905 A1 Mar. 3, 2011

(30) Foreign Application Priority Data

Aug. 31, 2009 (NL) .................................. 1037238

(51) Int. Cl.
*H04M 1/24* (2006.01)
*H04M 3/08* (2006.01)
*H04M 3/22* (2006.01)

(52) U.S. Cl. ............... 379/32.01; 379/22.02; 379/23; 379/351; 379/386; 324/76.45; 702/81; 455/9; 455/267

(58) Field of Classification Search ........... 379/1.01, 379/22.02, 23, 24, 27.02, 27.03, 31, 32.01, 379/32.02, 90.01, 93.26, 93.28, 207.07, 282, 379/351, 356; 370/522, 526; 702/75, 81; 455/9, 67.11, 67, 267, 702; 324/76.29, 76.31, 324/76.33, 76.44, 76.45
See application file for complete search history.

(56) References Cited

U.S. PATENT DOCUMENTS

| | | | | |
|---|---|---|---|---|
| 2,686,849 A | * | 8/1954 | Thomas | 455/9 |
| 4,797,931 A | * | 1/1989 | Furukawa et al. | 381/56 |
| 5,905,785 A | * | 5/1999 | Dunn et al. | 379/112.08 |
| 6,154,537 A | * | 11/2000 | Rizq et al. | 379/387.02 |
| 7,035,293 B2 | * | 4/2006 | Branden | 370/526 |
| 2002/0154760 A1 | * | 10/2002 | Branden | 379/386 |
| 2003/0071634 A1 | | 4/2003 | Johnson et al. | |

FOREIGN PATENT DOCUMENTS

JP 57-147340 9/1982

* cited by examiner

*Primary Examiner* — Binh Tieu
(74) *Attorney, Agent, or Firm* — Barnes & Thornburg LLP (57) ABSTRACT

A tone signal received in a telecommunications network is bandpass filtered based on an identified type of the received tone signal, providing a bandpass filtered tone signal. The tone signal is also bandstop filtered based on the identified type of the received tone signal, providing a bandstop filtered tone signal. The bandpass filtered tone signal and the bandstop filtered tone signal are analysed and the received tone signal is quantified based on the analysis result.

19 Claims, 4 Drawing Sheets

METHOD OF AND A DEVICE FOR QUANTIFYING A TONE SIGNAL RECEIVED IN A TELECOMMUNICATIONS NETWORK

CROSS-REFERENCE TO RELATED APPLICATIONS

The present application claims the benefit of priority to Netherlands Patent Application No. 1037238 filed 31 Aug. 2009, the contents of which is incorporated herein by reference in its entirety.

TECHNICAL FIELD

The present invention relates to telecommunications and, in particular, to quantification of tone signals exchanged in landline and wireless telecommunication systems and networks.

BACKGROUND

In telecommunications networks, for signalling purposes, different tone signals are exchanged between user equipment and network devices, such as telephones, switches, repeaters and radio access units or radio base stations in radio telecommunications networks.

An example of such a signalling tone signal is called "ringback tone signal". This is the audible ringing that is heard by a calling party at user equipment in a telecommunications network after dialing and prior to the call being answered by the called party. This ringback tone assures the calling party that a ringing signal is being transferred to the called party.

Different from the ringing signal, which is produced by the user equipment of the called party to indicate an incoming call or message, the ringback tone signal is not generated by the user equipment of the calling party.

The ringback tone signal may be generated by a local switch of the telecommunications network serving the calling party or by a remote switch of the telecommunications network serving the called party, for example.

The type of ringback tone, i.e. the sound, duration and rhythm of the ringback tone signal, may differ in various countries. The ringback tone signal may be out of synchronization with the actual ringing signal heard by the called party. The ringback tone signal generally starts and stops when the actual ringing signal provided to the called party starts and stops.

Private Branch eXchanges (PBX), for example, may forward a tone signal to a calling party if the switchboard operator has put the call on hold to transfer the incoming call to a desired called party.

Other tone signals may be produced by data modems or the like connected to a telephone line, for example.

It will be appreciated that, if the received tone signal is produced at a remote switch of a called party, for example, by evaluating the quality of the received tone signal one may get an indication about the quality of the telecommunications link between the calling party and the remote switch or another network device that produces the tone signal.

In the event of a bad quality, for example, provisions can be made to switch to another transmission line providing a better transmission quality or to control the receiving user equipment or network devices involved in the communication, in order to improve the quality of the transmission link. In radio telecommunications systems, a measure to improve the radio link quality can be to increase the RF transmit power at the side of the telecommunications network or to increase the receiver sensitivity at the end user device, for example.

In another application, the quality data derived from the received tone signals is gathered and analysed in association with route information of the telecommunications line over which the tone signal is received. From this analysis, for setting up a call to a particular destination, routes or telecommunications lines providing an unacceptable quality can be excluded. The other way around, one may of course use the gathered quality information to select particular routes or telecommunications lines providing a desired quality. Note that the term "telecommunications line" includes both wired and wireless connections.

SUMMARY

It is an object of the present invention to quantify a tone signal received in a telecommunications network.

In order to solve this object, in a first aspect, the present invention provides a method of quantifying a tone signal received in a telecommunications network, which method comprises the steps of:
 identifying a type of the received tone signal;
 selecting a type of bandpass filtering for the received tone signal based on the identified type of the received tone signal;
 bandpass filtering the received tone signal by the selected type of bandpass filtering, providing a bandpass filtered tone signal;
 selecting a type of bandstop filtering for the received tone signal based on the identified type of the received tone signal;
 bandstop filtering the received tone signal by the selected type of bandstop filtering, providing a bandstop filtered tone signal;
 analysing the bandpass filtered tone signal and the bandstop filtered tone signal, providing an analysis result, and
 quantifying the received tone signal from the analysis result.

According to the present invention, the received tone signal is subjected to bandpass filtering and bandstop filtering, wherein the type of filtering applied is selected on the basis of an identified type of the received tone signal. The bandpass filtered tone signal reflects the amount in which the received tone signal matches the ideal tone signal according to the identified type. The bandstop filtered tone signal contains all signal components which, in fact, should not be present when compared to the ideal tone signal according to the type of tone signal identified.

From an analysis of the bandpass filtered tone signal and the bandstop filtered tone signal, the received tone signal can be quantified for providing a quality indication thereof, for example.

In a further embodiment of the method according to the invention, in order to apply the correct filtering in accordance with the type of tone signal identified, the received tone signal is delayed to introduce additional time required to identify the type of the received tone signal.

In practice, the received tone signal may comprise a sequence of tone signal bursts. In accordance with a further embodiment of the invention, the delaying of the tone signal, the bandpass filtering and bandstop filtering as well as the analysing and quantifying steps are applied to each tone signal burst of the sequence of tone signal bursts.

In the case of ringback tone signals, for example, network operators sometimes generate a few bursts of a ringback tone signal from the local network equipment to which the user equipment of the calling party connects, before transferring the actual ringback tone signal bursts received from the remote network devices to which the called party connects. It will be appreciated that the type of ringback tone may differ in this case. By performing the above-mentioned steps to each tone signal burst separately, the correct bandpass and bandstop filtering can be applied, in accordance with the identified type of tone signal received, also after switching from a locally to a remotely generated ringback tone signal.

In a yet further embodiment of the method according to the invention, the received tone signal is quantified by the worst or lowest quality indication of a tone signal burst of the received plurality of tone signal bursts. By this, the quality of a locally generated tone signal is taken into account if this locally generated tone signal is of a less (worse) quality than the tone signal received from a remote network device.

It is of course possible to quantify the received tone signal by eliminating some of the first received tone signal bursts, thereby only providing a quantification of the received remotely generated tone signal.

In accordance with the present invention, in a further embodiment thereof, the received tone signal is subjected to spectral power computation in a plurality of predetermined frequency bands including DC, providing a spectral power distribution over the frequency bands, and wherein the type of received tone signal is identified among stored types of tone signals using the computed spectral power distribution.

The type of the received tone signal is than identified using peaks in the spectral power distribution, for example. That is, for the purpose of identification of the tone signal, spectral power peaks having a value above a threshold are selected and the position of these peaks in the computed spectral power distribution is compared to the position of peaks in the spectral power distribution of stored types of tone signals, for example.

In a yet further embodiment of the invention, if a received tone signal is not identified as a stored type of tone signal, for future use the respective received tone signal is stored as a new type of tone signal, for identifying a received tone signal. In a practical application, the tone signal is stored in relation to the position of the peaks in the spectral power distribution.

By this embodiment, a type of self-learning method is provided for quantifying tone signals received in any type of telecommunications network.

For analysing purposes, in an embodiment of the method according to the invention, a peak power and an average power of the bandpass filtered tone signal and the bandstop filtered tone signal are computed. If the computed power of the received tone signal as such is less than a predetermined threshold, the value of the computed power is set as a noise floor of the received tone signal.

The above disclosed steps according to the method of the invention can be performed using digital signal analysing techniques known to the person skilled in the art. When applying digital signal analysing techniques, in a further embodiment of the method according to the invention, the received tone signal is subdivided in frames having a predetermined, preferably equal, duration and the computations are applied at each separate frame of a plurality of frames.

In a still further embodiment of the method according to the invention, the quantifying of the analysis result is performed by judging whether the analysis result is within set boundaries. By assigning a set value to each judging result, a quality indication of the received tone signal can be computed. In particular, separate values are assigned to each judging result of the above-mentioned computed peak powers, the average powers and the noise floor.

The method according to the invention can be performed in a network device connected to the telecommunications network and/or in an end user device, such as a telephone terminal, connected to the telecommunications network.

In accordance with the invention, signal processing by the user equipment or the network device is controlled dependent on a computed quality indication value of the received tone signal.

The invention, in a further aspect thereof, provides a digital processing device arranged for performing the method as disclosed above, using suitable digital processing techniques and algorithms.

In particular, the present invention provides user equipment and a radio access device or radio base station for operation in a mobile communications network, comprising such a digital processing device. Further, the invention provides a network node comprising such a digital processing device.

The invention also provides a computer programme product comprising programme code instructions stored on a medium that can be read by a computer, such as but not limited to a floppy disk, a hard disk, CD-ROM, DVD, USB memory stick, and a storage medium that can be accessed via a data network, such as the Internet or Intranet, for causing the computer to perform one or more of the embodiments of the method according to the invention when the computer programme product is loaded in the main memory of a computer and is executed by the computer.

According to the invention, the computer programme and the computer programme product may be arranged for integration in or addition to a computer application for carrying out one or more of the embodiments of the method according to the invention in conjunction with the computer application in question.

The invention will be described in more detail hereinafter by means of examples and associated figures and illustrations, in relation to which it is noted that the invention as such is not restricted to the examples and/or the applications described herein.

DETAILED DESCRIPTION

Figure 1:
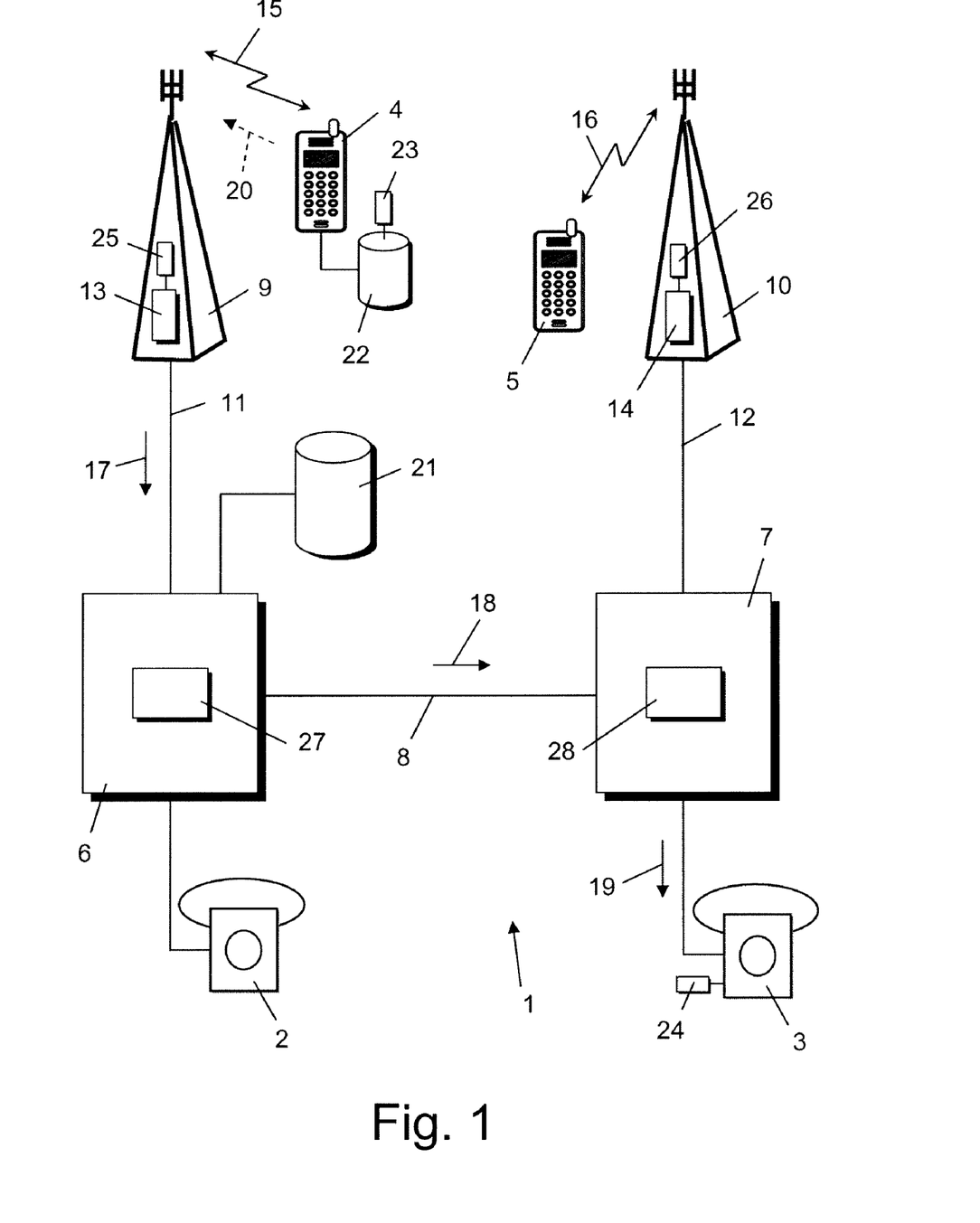
FIG. 1 shows, in a schematic and illustrative manner, part of a typical telecommunications network for performing the method according to the invention.

FIG. 1 refers to a typical (public) telecommunications network 1, such as a Public Switched Telephone Network (PSTN), an Integrated Services Digital Network (ISDN), an IP Multimedia Subsystem (IMS), a Global System for Mobile Communications (GSM), a UMTS Radio Access Network (UTRAN), etcetera, comprising wired 2, 3 and wireless 4, 5 user equipment. User equipment 2, 3, 4, 5 is shown in the form of telephone terminals. Use of the present invention is not limited to telephone terminals. Rather, the invention is applicable to any type of telecommunications devices operating with tone signals.

Reference numerals 6 and 7 denote remotely positioned nodes and/or switches and/or servers of the telecommunications network 1. The nodes 6 and 7 may connect by a trunk line 8. Although the wired user equipment 2, 3 is shown directly connected to a respective switch 6, 7, in practice, the wired user equipment 2, 3 may connect by a subscriber line or local loop to an intermediate local or end node, such as a Private Branch eXchange (PBX) for example, not shown.

For the purpose of wireless communications services, radio access units or radio base stations 9, 10 each connect to a respective node 6, 7 via wired links 11, 12, respectively. In practice, the links 11, 12 may also be radio links or a combination of wired and radio links, for example, and may connect through an intermediate Mobile telephone Switching office (MTSO) or the like, not shown.

The radio base stations 9, 10 comprise transceiver and control means 13, 14 for providing radio communication services to wireless user equipment 4, 5 in a limited geographical area surrounding a radio base station, also called a cell. This type of equipment and the operation and functions thereof are known to the skilled persons and will therefore not be repeated here. In FIG. 1, wireless user equipment 4 connects by a radio link 15 to radio base station 9 and wireless user equipment 5 connects by a radio link 16 to radio base station 10.

Those skilled in the art will appreciate that the telecommunications network 1 may comprises a plurality of user equipment 2, 3, 4, 5, nodes 6, 7 and radio base stations 9, 10 operated by one or a plurality of network operators in one or several countries.

Assume that a call is to be set up from the wired user equipment 3, i.e. the calling party, to the remote wireless user equipment 4, i.e. the called party.

The calling party selects the appropriate subscriber number of the user equipment 4 and forwards same from its user equipment 3 to the node 7 or an intermediate end node, if applicable.

By analysing the subscriber number of the called party received, node 7 signals node 6 over the trunk line 8 and, in turn, node 6 signals the radio base station 9 over the link 11. Eventually, the radio base station 7 sets up a radio link 15 to the user equipment 4 of the called party.

In modern telecommunications networks, the signalling is performed separately or partly separately from the actual establishing of a voice or data path between the user equipment 3, 4.

If the user equipment 4 is in a status that same can take a call, the user equipment 4 alerts the called party by an audible or visual or otherwise perceptible signalling, generally called a ringing signal. At the same time the voice or data path between the user equipment 3, 4 is established and the calling party 3 is alerted of the fact that the ringing signal is produced. The alerting of the calling user 3 is called a ringback tone signal.

Figure 2:
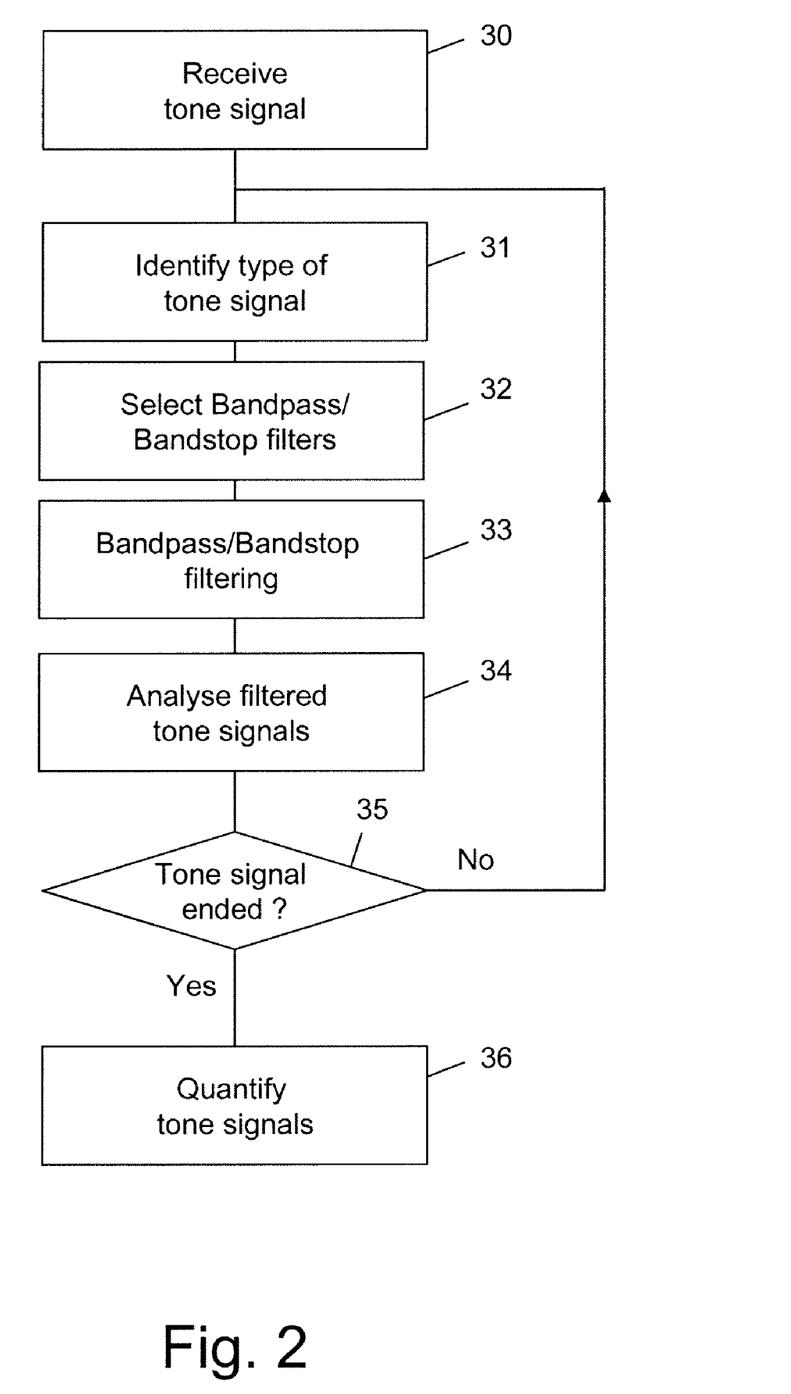
FIGS. 2-4 show, in a schematic and illustrative manner, flow charts showing steps performed by the method of the invention.

The ringback tone, in the example provided, is generated by the node 6 or the radio base station 9, or an intermediate MTSO if applicable, to which the remote called party connects, and is delivered via the established voice or data path at the user equipment 3 of the calling party. In FIG. 2, this is schematically denoted by arrows 17, 18 and 19. It will be appreciated that if the node 6 generates the ringback tone signal, the arrow 17 is not applicable.

As the voice or data path may not already been established while the called party is alerted by the ringing signal, the node 7 to which the calling user connects may generate first a few ringback tone signals for delivery at the user equipment 3 of the calling party. Once the voice or data path is established, the calling party will be alerted by the ringback tone signal 19 from the remote node 6 or the remote radio base station 9.

The type of ringback tone, i.e. the sound, duration and rhythm of the ringback tone signal, may differ in various countries or between different operators. The ringback tone signal may be out of synchronization with the actual ringing signal heard by the called party. The node 6 and/or the radio base station 9 control the ringback tone signal such that same generally starts and stops when the actual ringing signal provided to the called party starts and stops. Further, the received ringback tone signal may comprise a sequence of tone signal bursts.

For example, in the UK and many other Commonwealth countries, the ringback tone is a signature double beep. For most countries, it consists of a 0.4-second pulse, a 0.2-second pause, a 0.4-second pulse, and a 2-second pause. In some countries, the pulse is made by mixing a 400 Hz and 450 Hz sine wave. Other rhythms and frequencies may occur.

Those skilled in the art will appreciate that other tone signals than signalling tone signals may be transmitted over the speech or data path from user equipment of the called party to the calling party. Fax machines and data modems, for example, use standardized tone signals for data exchange over the data path. These tone signals are transmitted from the called user equipment, as schematically indicated by the dashed arrow 20 in FIG. 1.

For the purpose of the present invention, the type of tone signal received should be known at the receiver. To this end, information characterizing tone signals that may be received in the telecommunications network 1 is stored in a repository, as schematically indicated by reference numerals 21, 22.

Reference numeral 21 generally indicates a network tone signal repository available in the telecommunications network 1. In FIG. 1, this repository 21 connects to the node 6. However, the repository 21 may also connect to node 7 or any of the radio base stations 9, 10. Instead of one network tone signal repository 21, a plurality of network tone signal repositories may be provided.

Reference numeral 22 generally indicates a user equipment tone signal repository available in user equipment 2, 3, 4, 5. In FIG. 1, this repository 22 connects to the wireless user equipment 4. However, any other of the user equipment 2, 3, 5 may have a user equipment tone signal repository 22.

Figure 3:
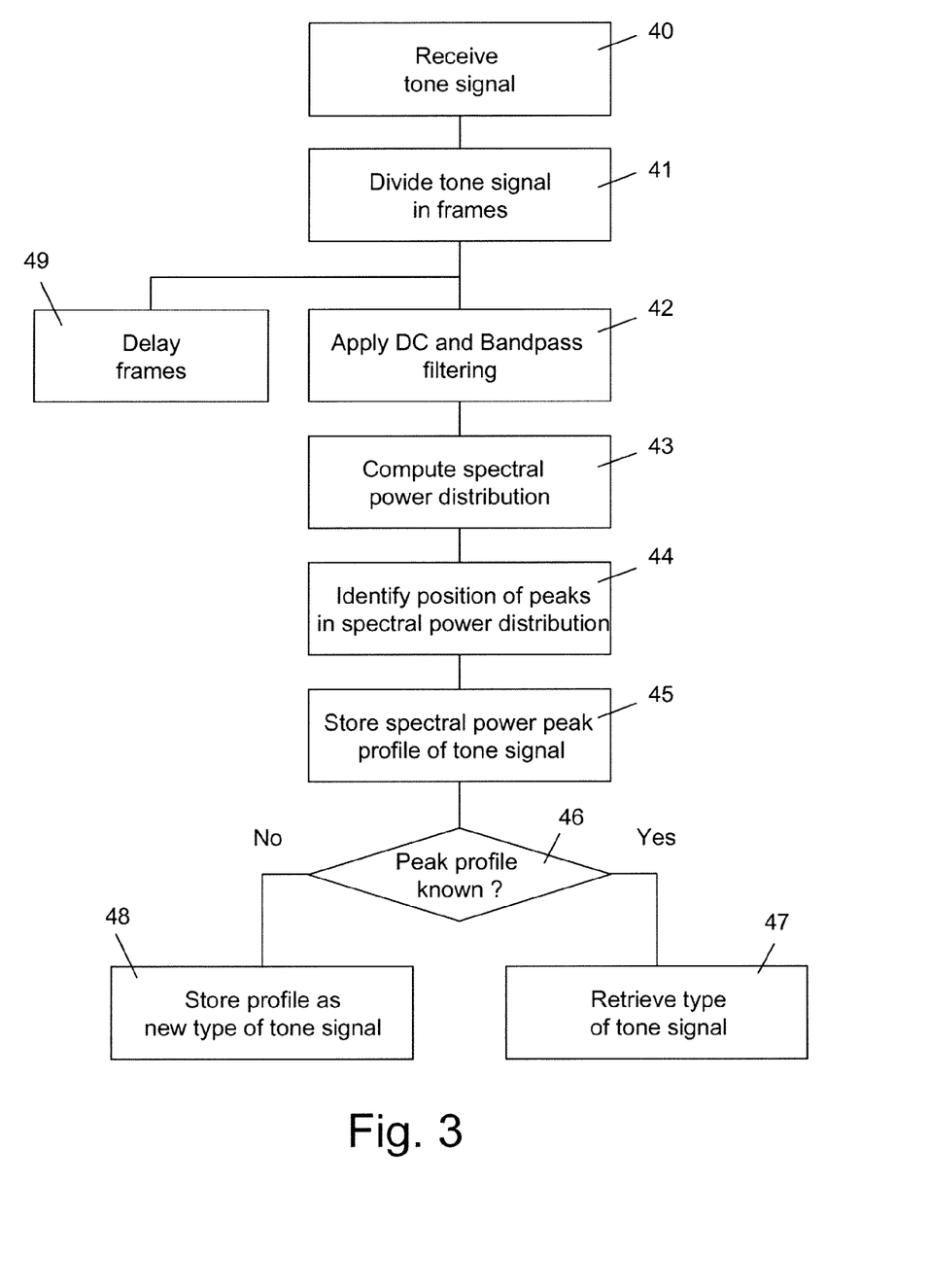
Figure 4:
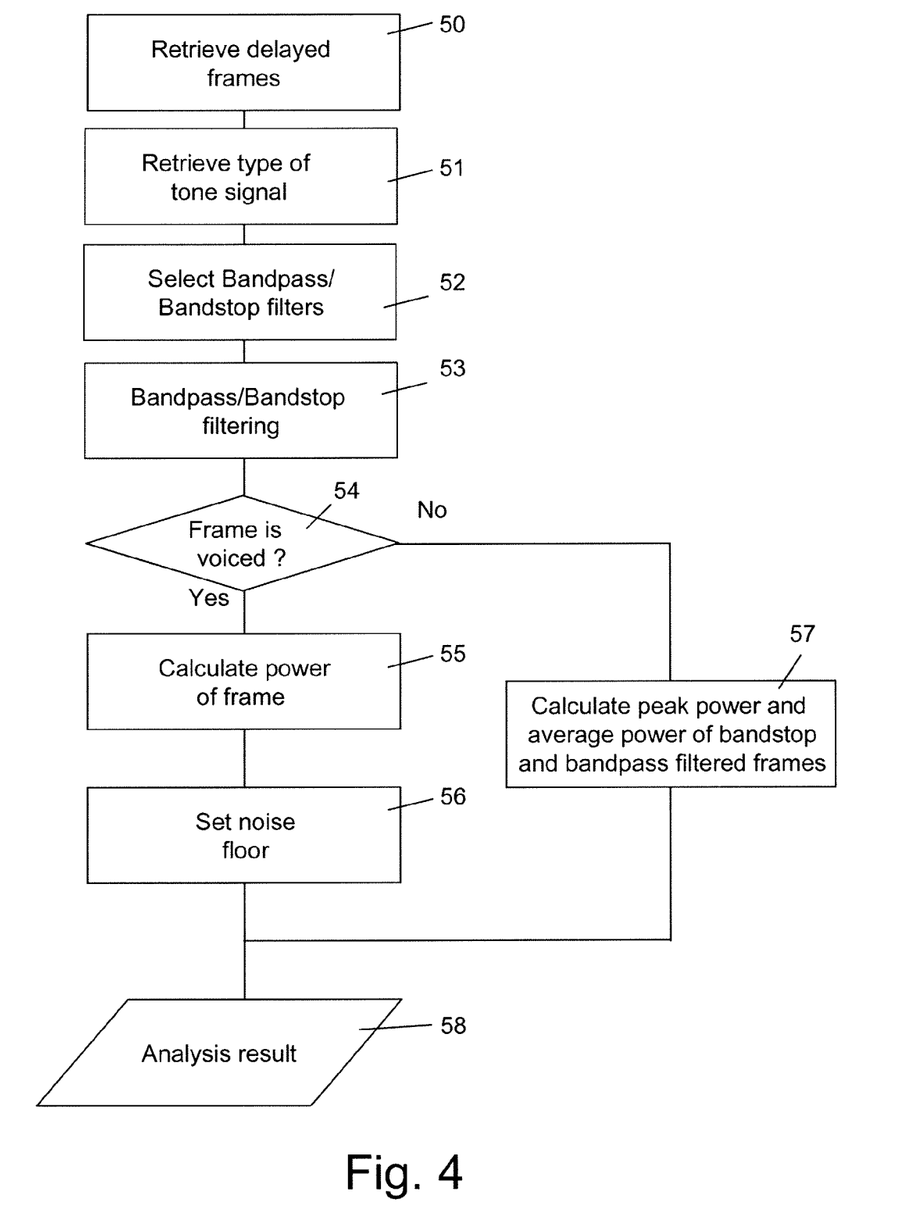

FIGS. 2-4 show flow chart diagrams, explaining the steps of the method of the invention. In the flow chart diagrams, the normal line of flow is from the top of the chart to the bottom thereof. Other flow directions are indicated by an arrow. Note that the steps disclosed may be performed at one or both the user equipment of the calling and called party or at equipment forming part of the telecommunications network.

In FIG. 2, the receipt of a tone signal by user equipment 2, 3, 4, 5 and/or a network device, such as a node 6, 7 or a radio base station 9, 10 connecting to the telecommunications network 1 is indicated by block 30, "Receive tone signal". This the analog audio signal, after decoding and/or demodulating.

Next, the type of tone signal received is identified, as schematically shown by block 31 "Identify type of tone signal". The type of tone signal may be identified in several ways. In the case of a signalling tone signal, sometimes dialing information provided by the calling party may be used.

Characteristics of the tone signal such as the durations of the pulses and pauses, i.e. the rhythm of the tone, and the frequency or frequencies of the pulses, for example, provide the most reliable information for tone type detection. It will be appreciated that in the case of fax or modem tone signals to be identified, one may identify the type of user equipment, i.e. fax, modem, etc. from characteristics of the tone signal received.

Equipment for analysing dialing information and/or determining pulse and pause duration and frequencies in a received tone signal is as such known to the skilled person and needs no further elucidation.

Once the type of tone signal has been identified, bandstop and bandpass filters are selected based on the identified type of tone signal, as indicated by block 32, "Select Bandpass/Bandstop filters". A skilled person will appreciate that selecting also comprises configuring or adjusting the bandpass and bandstop filters.

After the bandstop and bandpass filters are selected, filtering is applied to the received tone signal, as indicated by block 33 "Bandpass/Bandstop filtering". As mentioned, the bandpass and bandstop filters are selected or set based on the identified type of the received tone signal. The result of this step is a bandpass filtered tone signal and a bandstop filtered tone signal.

Next, the obtained bandpass filtered and a bandstop filtered tone signals are analysed such as whether the signals received are indeed tone signals, whether the received signal is above a noise floor, the frequency of the tone or tones making up the tone signal, and others. This is schematically indicated by block 34, "Analyse filtered tone signals".

The analysis result is provided to block 36, "Quantify tone signals", for providing a quantification of the received and analysed tone signal. The quantification provided may be a quality figure of the tone signal, for example, compared to an ideal tone signal, the properties of which may be stored in a repository 21, 22, for example, see FIG. 1. The quantification may also be a quality figure of the communication link or of the device used in the telecommunication network for receiving, or sending, the tone signal, for example a user equipment, a radio access device or a network node.

The steps 31-34 are performed on a received tone signal 30 as long as the tone signal is available, i.e. answer "No" of comparison block 35 "Tone signal ended?". The quantification in block 36 is performed on all the analysis results gathered, once the tone signal stopped, i.e. answer "Yes" of comparison block 35.

As discussed above, the tone signal can be identified from several parameters and information. FIG. 3 shows an embodiment, according to the invention, for identifying the received tone signal, i.e. block 31 of FIG. 2, by its frequency characteristics, applying digital signal analysing techniques.

Block 40 identifies receipt of a tone signal, i.e. "Receive tone signal". This block is identical to block 30 shown in FIG. 2.

The received tone signal is divided in frames of, preferably, equal duration, for example frames of 20 ms long. Block 41, "Divide tone signal in frames".

Each frame of the tone signal is subjected to DC and bandpass filtering. In a preferred embodiment, for analysis of ringback tone signals, four bandpass filters are used, ranging from 10-40 Hz, 25-75 Hz, 110-150 Hz and 375-505 Hz, respectively. These bandpass filters can be provided as two-sections active biquad filters, for example. For analysis of other tone signals, other bandpass filters will be used.

The DC an bandpass filtered frames of the received tone signal are digitized and subjected to a Discrete Fourier Transform (DFT) analysis, for computing the frequency components of the tone signal. The technique of DFT analysis is known to skilled person and needs no further elucidation here.

Next the spectral power distribution of the DFT analysis result is computed, providing a spectral power distribution over the frequency bands of the applied bandpass filtering. The step of DFT analysis and computation of the spectral power distribution are represented by a single block, i.e. block 43 "Compute spectral power distribution". This to indicate that other techniques may be used for computing the spectral power distribution of the frames of the received tone signal.

For identification and/or characterization of the received tone signal, the positions of peaks in the computed spectral power distribution are identified. Block 44, "Identify position of peaks in spectral power distribution".

The threshold for identifying spectral power peaks may be dynamically set, by calculating an average spectral power of the signal with respect to a particular frequency band and setting the threshold to the calculated average value or at multiple thereof. The threshold may also be computed, for example, relative to the maximum spectral power peak value in the received tone signal by setting the threshold to a predetermined fraction of this maximum, for example at 25% of the maximum. Of course, other settings are possible.

The positions of the spectral power peaks of the received tone signal form a so-called peak profile, which will be temporarily stored. Block 45, "Store spectral power peak profile of tone signal".

Using the thus determined peak profile, the type of the received tone signal is identified among stored types of tone signals, i.e. their spectral power peak profile or distribution. Comparison block 46, "Profile known?". The known peak profiles may be stored in any of the repositories 21 and 22, for example, see FIG. 1.

If the peak profile is known, i.e. already stored in any of the repositories 21 and 22, answer "Yes" of comparison block 46, the type of the received tone signal, i.e. the ideal characteristics or properties thereof, can be retrieved from a repository 21, 22 for the purpose of applying appropriate bandpass/bandstop filtering, i.e. block 32 in FIG. 2, according to the present invention. This is schematically indicated by block 47, "Retrieve type of tone signal".

If the received tone signal is not identified as a stored known type of tone signal, the received tone signal, i.e. its peak profile, is stored as a new type of tone signal in any or all of the repositories 21, 22, such as indicated by block 48 "Store profile as new type of tone signal".

The above steps of identification, profile forming and comparison may be performed using a suitably programmed digital processing device and memory.

To apply the correct bandpass/bandstop filtering to all the frames of the received tone signal, the frames of block 41 are temporarily stored and delayed in a frame delay buffer for the time required to identify the type of tone signal from a frame, before providing the frames to the selection and bandpass/bandstop filtering, i.e. blocks 32 and 33 in FIG. 2. This delay is schematically indicated in FIG. 3 by block 49, "Delay frames".

FIG. 4 shows the processing steps of an embodiment of the invention for applying bandpass and bandstop filtering and analysis of the received tone signal, i.e. blocks 33 and 35 as shown in FIG. 2, respectively.

The delayed digital frames of the tone signal are fetched from the delay buffer of block 49 of FIG. 3. Block 50 in FIG. 4, "Retrieve delayed frames". Further, the identified type of the tone signal is retrieved, block 51 "Retrieve type of tone signal".

Next, the identified type of tone signal is used as a basis for selecting the bandpass and bandstop filtering, as indicated by block 52, "Select Bandpass/Bandstop filters". The retrieved frame is then subjected to bandpass and bandstop filtering, block 53 "Bandpass/Bandstop filtering". See also block 33 of FIG. 2. As mentioned, the parameters of the applied filtering are set based on the identified type of the tone signal. Preferably, the bandpass and bandstop filters are steep digital filters, carefully designed to have a fast settling time. The results of the bandpass and bandstop filtering in block 53 are a bandpass filtered frame of the received tone signal and a bandstop filtered frame of the received tone signal.

The bandpass filtered frame reflects the amount in which the received tone signal matches the ideal tone signal according to the identified type. The bandstop filtered frame contains all signal components which, in fact, should not be present when compared to the ideal tone signal according to the type of tone signal identified.

Before analysing the filtered frames of the tone signal, it is first checked whether the frame is not a voiced frame, i.e. containing speech, comparison block 54 "Frame is voiced?". In the affirmative, i.e. answer "Yes" of the comparison, the signal power of the frame is calculated, block 55 "Calculate power of frame". If the calculated power is less than a set value, for example −35 dB, the calculated power is set as a noise floor. Block 56, "Set noise floor". A voiced frame indicates an amount of cross-talk, for example.

Suitable digital processing algorithms for checking whether the frame contains voiced data and calculating the signal power of the frame are known to the skilled person. For the purpose of the present invention, these algorithms are not further described here.

If it is established that the frame is not a voiced frame, i.e. answer "No" of comparison block 54, a peak power value and an average power value of both the bandstop filtered frame of the tone signal and the bandstop pass filtered frame of the tone signal are computed. Block 57, "Calculate peak power and average power of bandstop and bandpass filtered frames".

The result of the computations of blocks 56 and 57 is intermediately stored as the analysis result for quantifying of the received tone signal, such as schematically indicated by block 58, "Analysis result".

The above computations are applied at all or a plurality of frames of the received tone signal.

By judging whether the analysis result is within predetermined boundaries and assigning a set value to each judging result, the received tone signal is quantified in accordance with block 36 of FIG. 2.

The analysis result, among others, is judged with respect to the peak power over a plurality of frames, the average power over a plurality of frames, the ratio of the computed bandstop and bandpass peak power, the ratio of the computed bandstop and bandpass average power, and the value of the computed noise floor.

By assigning to each result of the above judgements a quantification value between zero and hundred, for example, and weighing the obtained quantification values, a quality indication of the received tone signal is computed having a value ranging from 0-100. This value is called the RTQ value. An RTQ value of 100 indicates that an ideal tone signal has been received. An RTQ value equal to zero indicates the utmost bad quality.

To take into account the worst case scenario, the received tone signal may be qualified from the worst quantifications of the tone signal.

In practice, the received tone signal may be comprised of a sequence of tone signal bursts. In such case, in accordance with the invention, the above discussed steps are applied to each tone signal burst of a plurality of tone signal bursts of the sequence of tone signal bursts. From the quantifications of the several bursts, a final quality value can be calculated as disclosed above.

As disclosed in the introductory part of the present specification, in the case of ringback tone signals, for example, network operators sometimes generate a few bursts of a ringback tone signal from the local network equipment to which the user equipment of the calling party connects before transferring the actual ringback tone signal bursts received from the remote network devices to which the called party connects.

When quantifying a received ringback tone signal, for example, a first few of the received bursts of the tone signal may be excluded from the quantification in block 36 of FIG. 2.

After digitization of the frames of the received tone signal, the processing steps and computations are performed using digital processing techniques which can be implemented on suitably programmed digital processors, or digital computers as known in the art.

The digital processing equipment (processors, buffers, etc.) and filters can be implemented in user equipment and/or network devices of the telecommunication network 1, as schematically indicated in FIG. 1 by reference numerals 23-24, 25-28, respectively.

On the basis of the computed RTQ value and in connection with network routing information, the several network devices 6, 7, 9, 10 may be controlled for excluding transmission lines providing a bad quality and/or to select particular routes or telecommunications links providing a desired quality, for example.

The present invention is not limited to the embodiments as disclosed above, and can be modified and enhanced by those skilled in the art beyond the scope of the present invention as disclosed in the appended claims without having to apply inventive skills.

The invention claimed is:

1. A method of quantifying a tone signal received in a telecommunications network, said method comprising the steps of:
   identifying a type of said received tone signal;
   selecting a type of bandpass filtering for said received tone signal based on said identified type of said received tone signal;
   bandpass filtering said received tone signal by said selected type of bandpass filtering, providing a bandpass filtered tone signal;
   selecting a type of bandstop filtering for said received tone signal based on said identified type of said received tone signal;
   bandstop filtering said received tone signal by said selected type of bandstop filtering, providing a bandstop filtered tone signal;
   analysing said bandpass filtered tone signal and said bandstop filtered tone signal, providing an analysis result, and
   quantifying said received tone signal from said analysis result.

2. The method according to claim 1, wherein said received tone signal is comprised of a sequence of tone signal bursts, wherein said bandpass filtering, said bandstop filtering, said analysing and said quantifying is applied to each tone signal burst of a plurality of tone signal bursts of said sequence of tone signal bursts.

3. The method according to claim 1, wherein said received tone signal is comprised of a sequence of tone signal bursts, and said received tone signal is quantified by a worst quantification of a tone signal burst of said plurality of tone signal bursts.

4. The method according to claim 1, wherein said received tone signal is delayed before applying said bandpass filtering and said bandstop filtering, for identifying said type of received tone signal and for selecting an applicable type of bandpass and bandstop filtering based on said identified type of said received tone signal.

5. The method according to claim 1, wherein said received tone signal is subjected to spectral power computation in a plurality of predetermined frequency bands including DC, providing a spectral power distribution over said frequency bands, and wherein said type of received tone signal is identified among stored types of tone signals using said spectral power distribution.

6. The method according to claim 1, wherein said received tone signal is subjected to spectral power computation in a plurality of predetermined frequency bands including DC, providing a spectral power distribution over said frequency bands, and wherein said type of received tone signal is identified among stored types of tone signals from peaks in said spectral power distribution having a value above a threshold and from a position of said peaks in said spectral power distribution.

7. The method according to claim 1, wherein said quantifying of said analysis result comprises judging whether said analysis result is within set boundaries, providing a judging result, and assigning a set value to said judging result.

8. The method according to claim 1, wherein said analysing of said bandpass filtered tone signal and said bandstop filtered tone signal comprises computation of peak power and average power of each of said bandpass filtered tone signal and said bandstop filtered tone signal.

9. The method according to claim 1, wherein said received tone signal is subjected to power computation and wherein if said computed power is less than a predetermined threshold, said computed power is set as a noise floor.

10. The method according to claim 1, wherein a quality indication of said received tone signal is computed from computations of peak power, average power and noise floor of said received tone signal.

11. The method according to claim 1, applied at a plurality of frames of said received tone signal, each frame having a predetermined duration.

12. The method according to claim 1, wherein said received tone signal comprises any of a signalling tone signal and a ringback tone signal.

13. The method according to claim 1, wherein said received tone signal is a tone signal transmitted from user equipment of said called party.

14. The method according to claim 1, performed in any of user equipment and network devices connected to said telecommunications network.

15. The method according to claim 1, wherein signal processing by at least one of user equipment and network devices connected to said telecommunications network is controlled based on said quantifying of said received tone signal.

16. A device for operating with a telecommunications network, said device comprising processing equipment arranged for:
 receiving a tone signal in said telecommunications network;
 identifying a type of said received tone signal;
 selecting a type of bandpass filtering for said received tone signal based on said identified type of said received tone signal;
 bandpass filtering said received tone signal by said selected type of bandpass filtering, providing a bandpass filtered tone signal;
 selecting a type of bandstop filtering for said received tone signal based on said identified type of said received tone signal;
 bandstop filtering said received tone signal by said selected type of bandstop filtering, providing a bandstop filtered tone signal;
 analysing said bandpass filtered tone signal and said bandstop filtered tone signal, providing an analysis result, and
 quantifying said received tone signal from said analysis result.

17. The device according to claim 16, wherein said device comprises any of a group including a user equipment, a radio access device and a network node.

18. A computer programme product comprising program code instructions stored on a computer readable medium for causing a computer to carrying out the method according to claim 1, when said computer program product is loaded in a memory of a computer and is carried out by said computer.

19. The computer program product according to claim 18, arranged for integration in or addition to a computer application for carrying out the method according to claim 1, when said computer program product is loaded in a memory of a computer and is carried out by said computer.

* * * * *